Aug. 25, 1959     B. A. RICHARDS     2,900,734
GAUGE FOR TORSION BAR SUSPENSION SYSTEMS FOR VEHICLES

Filed May 13, 1957

Inventor
BURTON A. RICHARDS
by: Gary, Desmond & Parker
attys.

United States Patent Office 2,900,734
Patented Aug. 25, 1959

2,900,734

GAUGE FOR TORSION BAR SUSPENSION SYSTEMS FOR VEHICLES

Burton A. Richards, Rock Island, Ill., assignor to Bear Manufacturing Company, Rock Island, Ill., a corporation of Delaware Application May 13, 1957, Serial No. 658,776

4 Claims. (Cl. 33—180)

This invention relates to improvements in a gauge for measuring or checking the suspension height of torsion bar suspension systems employed on automotive vehicles.

For a predetermined vehicle it is desirable to have the torsion bar on each side of the vehicle, when the vehicle is unloaded and at rest, subjected to such torsions that the vehicle is level and that the suspension height is within predetermined limits. Due to unequal weight distribution on each side of the vehicle and also due to the fact that the characteristics of the torsion bars on each side may be slightly different the absolute initial torsion of the bars may not be exactly equal. However, within commercial tolerances when the suspension height of the vehicle is within predetermined limits and the vehicle is level, the desired torsion on the bars is obtained.

During use of the vehicle, however, the level of the vehicle may change or the suspension height may change, which requires that the torsion bars be adjusted to change the torsion. This can be done by increasing or decreasing the torsion of the bars by rotating them about their axes by means of conventional lever arm adjustments provided at their rear anchorage until the desired suspension height and level is secured.

In initially torsioning the bars or resetting the torsion thereof, it has heretofore been the practice to measure the distance between two measuring points on the control arm of the suspension system on each side of the vehicle, to the ground. This is a laborious and inconvenient task.

The present invention is directed to a gauge which greatly simplifies the task of securing the desired measurements, giving comparative information as to check points on the opposite control arms for purposes of determining level and simultaneously giving information as to absolute suspension height.

The features of the invention will be more apparent from the accompanying drawing and following detailed description.

Figure 1:
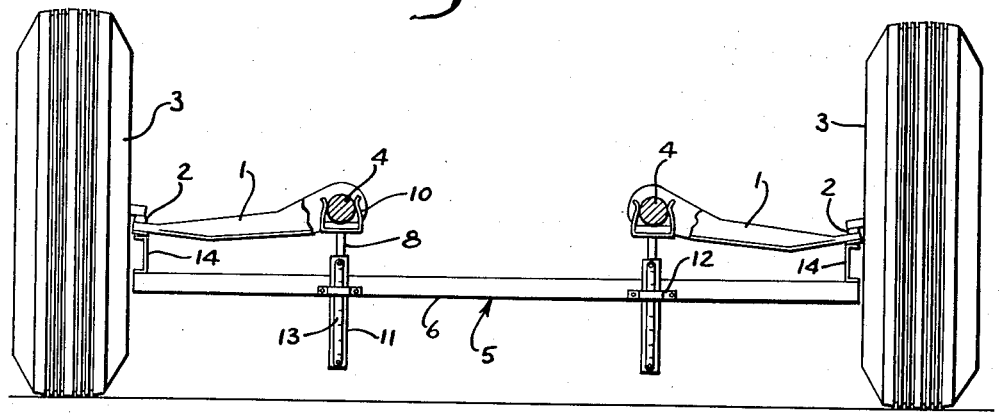
Fig. 1 is a diagrammatic front elevational view of an automotive vehicle, the front wheels and a portion of the suspension system only being shown.
Figure 2:
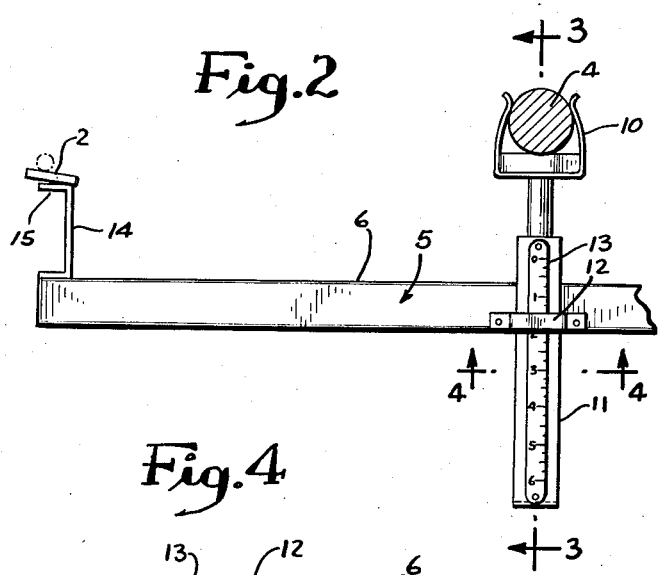
Fig. 2 is an enlarged view of a portion of the gauge, embodying the concepts of the present invention, applied to the measuring points of a suspension system.
Figure 3:
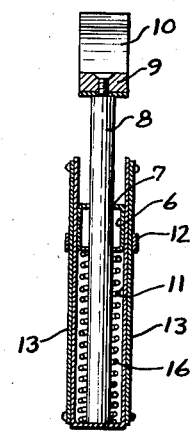
Fig. 3 is a longitudinal sectional view taken on line 3—3 of Fig. 2.
Figure 4:
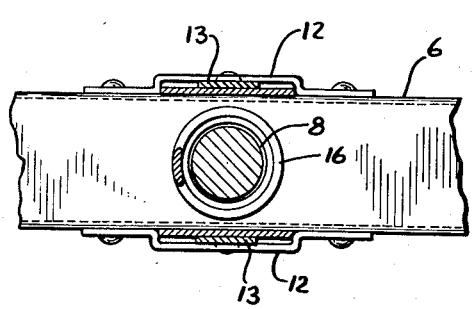
Fig. 4 is an enlarged transverse sectional view taken on line 4—4 of Fig. 2.

In the conventional independent front wheel suspension systems, the body of the vehicle is essentially suspended at each side of the vehicle upon lower control arms 1, 1. The outer ends of these arms are secured to a lower ball joint assembly 2 which comprises a portion of wheels 3. When the body of the vehicle moves downwardly relative to the wheels, the lower control arms 1 essentially rotate about the ball joint assemblies 2, that is, arm 1 on the left side of Fig. 1 rotates about the ball joint assembly 2 in a clockwise direction and arm 1 on the right side of Fig. 1 rotates about the ball joint assembly 2 in a counterclockwise direction.

In employing a torsion bar suspension system, arms 1 are rigidly connected to torsion bars 4 both of which extend substantially longitudinally of the vehicle and are locked or anchored at their rear ends by conventional means (not shown). Hence, from the simplified diagrammatic view shown in Fig. 1, it will be apparent that the weight of the vehicle is supported by and resiliently resisted by torsion set up in the bars 4.

It can also be appreciated that the height of the vehicle upon the wheels 3 is a function of the torsion stress set up in bars 4 and that the levelness of the vehicle is a function of the torsion in one bar 4 relative to the torsion in the bar 4 on the opposite side.

Hence, in adjusting a torsion bar suspension system two factors of adjustment must be correlated, the height of the vehicle relative to the wheels or to the ground, assuming level ground, and the levelness of the vehicle.

The suspension height, within a predetermined range, depends upon the type and make of the vehicle as does also the permissible differential in height between opposite sides of the vehicle. For instance, in one type of vehicle the tolerance or range of suspension height is maintained plus or minus ⅛ inch with a maximum differential from right to left side of ⅛ inch.

Of course, in so far as the present invention is concerned the specific tolerances or ranges, in question, are immaterial, but are simply set forth for purposes of illustrating the general order of magnitudes involved.

In testing the suspension height and differential from side to side it has been customary to make measurement from two measuring points on each lower control arm to the ground. One measurement obtained comprises the distance between the lower portion of the ball joint assembly to the ground and the other is from the lower portion of the torsion bar 4 to the ground. Accordingly, to test the suspension system four measurements must be taken, and as the torsions of the bars 4 are changed in making adjustments, the changing four dimensions must be continuously observed, as a guide to the making of the adjustments.

As a feature of the present invention a gauge 5 is contemplated which conveniently gives all the necessary information as to the proper adjustment of the torsion bar suspension system. The gauge 5 comprises a rod 6, preferably of light weight, hollow, metal construction, and preferably of square or rectangular section, of a length determined by the distance between the lower surfaces of the opposite ball joints. The rod 6 is provided with two apertures 7 spaced from each other a distance substantially equal to the spacing of one torsion bar 4 from its opposite companion bar. A plunger bar 8 is slidably positioned in each aperture 7 and each plunger at its head carries a block 9 to which a U-shaped spring clip 10 is secured.

The lower end of each plunger bar 8 carries a substantially U-shaped strap 11 which slidably extends through guides 12 carried by rod 6. A calibrated scale 13 is secured to each opposite face of each strap 11. At each end of the rod 6 a channel member or abutment 14 is carried, the upper flange 15 of each abutment being adapted to contact the lower surface of a ball joint assembly 2.

In employing the gauge, the tires of the vehicle are inflated to their specified pressure and the vehicle is disposed upon a substantially level surface. With the vehicle unloaded the gauge is applied. The clips 10 are brought into engagement with the torsion bars 4 and by virtue of the resiliency of the clips, the rod 6 is suspended. The channels or abutments 14 are disposed in abutting relationship with the lower measuring points of the ball joint assemblies and in being so positioned a coil spring 16, which embraces each plunger bar 8 between the U-bend of the strap 11 and the lower surface of rod 6, is compressed and the entire gauge is thus held in firm contact with the four measuring points in question.

The calibrations carried by scales 13 may conveniently indicate difference in elevation between the measuring points at ball joint assembly 2 and the torsion bar 4. Inasmuch as the distance between the measuring point at the ball joint assembly and the ground is a constant, the elevation of the measuring point on the torsion bar can be readily read on the scale 13. The same being true of each of the measurements indicated on each arm 1, the transverse level as well as the suspension height can be directly determined from the scales 13.

Inasmuch as tests and adjustments must be made while the vehicle rests upon its wheels, it is of frequent occurrence that such adjustments must be made in cramped quarters for the operator. Accordingly, it can be readily appreciated that a gauge or measuring device which is self supported upon the assembly being measured is of great convenience, particularly where, during the rotation or "winding up" of the torsion bars the measurements continuously change and must be continuously observed.

I claim as my invention:

1. A gauge for measuring the suspension height of a torsion bar suspension system for vehicles, which comprises an elongated rod, an abutment of fixed length carried at each end of said rod, a pair of plunger bars carried by said rod and being slidably movable transversely with respect to said rod, a spring clip carried by each plunger bar, resilient means connecting said rod and each plunger bar for resiliently urging said rod toward said spring clips, and a calibrated scale associating said plunger bars and said rod to indicate the position of said spring clips with respect to said rod.

2. A gauge for measuring the suspension height of a torsion bar suspension system for vehicles, which comprises an elongated rod, an abutment of fixed length carried at each end of said rod, said abutments extending transversely from said rod in the same direction, a pair of plunger bars carried by said rod and being slidably movable transversely with respect to said rod, a spring clip carried by each plunger bar on the same side of said rod as said abutments, resilient means connecting said rod and each plunger bar for resiliently urging said rod toward said spring clips, and a calibrated scale associating said plunger bars and said rod to indicate the position of said spring clips with respect to said rod.

3. A gauge for measuring the suspension height of a vehicle torsion bar suspension system of the type having opposite control arms pivotally connected to the respective wheels of a vehicle at corresponding ends and having their opposite ends resiliently biased by opposite torsion bars, said gauge comprising an elongated rod for positioning substantially parallel to said control arms, an abutment of fixed length carried at each end of said rod and extending transversely to said rod for respectively abutting the pivotal connections between the control arms and the wheels, a pair of plunger bars carried by said rod and being slidably movable axially with respect to said rod in a direction substantially parallel to said abutments, said plunger bars being spaced from each other longitudinally of said rod, a spring clip carried by each plunger bar for removably gripping the respective torsion bars, resilient means bearing upon said rod and each plunger bar resiliently resisting movement of said rod away from said spring clips to hold the abutments in resilient contact with said pivotal connections, and a calibrated scale secured to each plunger bar for measuring the position of said plunger.

4. A gauge for measuring the suspension height of a vehicle torsion bar suspension systems of the type having opposite control arms pivotally connected to the respective wheels of a vehicle at corresponding ends and having their opposite ends resiliently biased by opposite torsion bars, said gauge comprising an elongated rod for positioning beneath said control arms, an abutment of fixed length carried at each end of said rod and extending upwardly from said rod for respectively abutting the pivotal connections between the control arms and the wheels, a pair of plunger bars carried by said rod and being slidably movable axially with respect to said rod, said plunger bars being spaced from each other longitudinally of said rod, a spring clip carried by each plunger bar for removably gripping the respective torsion bars, resilient means bearing upon said rod and each plunger bar resiliently resisting movement of said rod away from said spring clips to hold the abutments in resilient contact with said pivotal connections, and a calibrated scale secured to each plunger bar for measuring the position of said plunger.

References Cited in the file of this patent

UNITED STATES PATENTS

| | | |
|---|---|---|
| 1,407,803 | Patterson | Feb. 28, 1922 |
| 1,440,067 | Duby | Dec. 26, 1922 |
| 1,554,324 | Beeler | Sept. 22, 1925 |
| 2,603,881 | Holaday | July 22, 1952 |
| 2,619,731 | Zenz | Dec. 2, 1952 |
| 2,672,597 | Ritch | Mar. 16, 1954 |